United States Patent
Sobolevskiy et al.

(10) Patent No.: US 7,976,805 B2
(45) Date of Patent: Jul. 12, 2011

(54) SELECTIVE CATALYTIC REDUCTION SYSTEM AND PROCESS FOR TREATING NOX EMISSIONS USING A PALLADIUM AND RHODIUM OR RUTHENIUM CATALYST

(75) Inventors: Anatoly Sobolevskiy, Orlando, FL (US); Joseph A. Rossin, Columbus, OH (US); Michael J. Knapke, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/773,052

(22) Filed: May 4, 2010

(65) Prior Publication Data

US 2010/0300061 A1      Dec. 2, 2010

Related U.S. Application Data (63) Continuation-in-part of application No. 12/472,633, filed on May 27, 2009, now Pat. No. 7,744,840, which is a continuation-in-part of application No. 12/122,116, filed on May 16, 2008, now Pat. No. 7,718,153.

(51) Int. Cl.
  *B01D 53/56*   (2006.01)
  *B01D 53/74*   (2006.01)
  *G05D 21/00*   (2006.01)

(52) U.S. Cl. ............ 423/239.1; 422/105; 422/129; 422/168; 422/177; 422/187

(58) Field of Classification Search ............ 423/239.1; 422/105, 129, 168, 177, 187
See application file for complete search history.

(56) References Cited

U.S. PATENT DOCUMENTS

| | | | |
|---|---|---|---|
| 4,312,638 A | 1/1982 | Koump | |
| 5,543,124 A | 8/1996 | Yokota et al. | |
| 5,589,142 A | 12/1996 | Gribbon | |
| 5,710,085 A | 1/1998 | Absil et al. | |
| 5,753,192 A * | 5/1998 | Dobson et al. | 422/177 |
| 5,891,409 A | 4/1999 | Hsiao et al. | |
| 5,955,039 A | 9/1999 | Dowdy | |
| 6,420,295 B1 | 7/2002 | Wu et al. | |
| 6,689,709 B1 | 2/2004 | Tran et al. | |
| 7,049,261 B2 | 5/2006 | Nam et al. | |
| 7,105,137 B2 | 9/2006 | Efstathiou et al. | |

(Continued)

FOREIGN PATENT DOCUMENTS

JP   4-341325 A   11/1992

(Continued)

OTHER PUBLICATIONS

O. Maurstad; "An Overview of Coal Based Integrated Gasification Combined Cycle (IGCC) Technology"; MIT publication No. LFEE 2005-002 WP; Sep. 2005; 46 pgs; (http:free.mit.edu/publications); Cambridge, MA.

(Continued)

*Primary Examiner* — Timothy C Vanoy (57) ABSTRACT

A process for the catalytic reduction of nitrogen oxides (NOx) in a gas stream (29) in the presence of $H_2$ is provided. The process comprises contacting the gas stream with a catalyst system (38) comprising zirconia-silica washcoat particles (41), a pre-sulfated zirconia binder (44), and a catalyst combination (40) comprising palladium and at least one of rhodium, ruthenium, or a mixture of ruthenium and rhodium.

20 Claims, 3 Drawing Sheets

U.S. PATENT DOCUMENTS

| | | | |
|---|---|---|---|
| 7,422,731 B2 | 9/2008 | Nakatsuji et al. | |
| 7,585,477 B2 | 9/2009 | Nakatsuji et al. | |
| 7,666,375 B2 | 2/2010 | Nakatsuji et al. | |
| 7,674,743 B2 | 3/2010 | Gandhi et al. | |
| 7,718,153 B2 * | 5/2010 | Sobolevskiy et al. | 423/239.1 |
| 7,744,840 B2 * | 6/2010 | Sobolevskiy et al. | 423/239.1 |
| 2006/0009352 A1 | 1/2006 | Zhao et al. | |
| 2006/0009353 A1 | 1/2006 | Cai et al. | |
| 2007/0110643 A1 | 5/2007 | Sobolevskiy et al. | |
| 2007/0181854 A1 | 8/2007 | Briesch et al. | |
| 2007/0249855 A1 | 10/2007 | Kanner | |
| 2007/0289214 A1 | 12/2007 | Briesch et al. | |
| 2008/0233466 A1 | 9/2008 | Yuasa et al. | |
| 2008/0242533 A1 | 10/2008 | Saito | |
| 2008/0299016 A1 | 12/2008 | Sobolevskiy et al. | |

FOREIGN PATENT DOCUMENTS

| | | |
|---|---|---|
| JP | 2000-342972 A | 12/2000 |
| JP | 2001-162171 A | 6/2001 |
| JP | 2006-289175 A | 10/2006 |

OTHER PUBLICATIONS

A. Fritz, V. Pitchon; "Review The current state of research on automotive lean NOx catalysis"; Applied Catalysis B: Environmental 13 (1997); Oct. 30, 1996; 1-25; 1997 Elsevier Science B.V.

R. Burch, M.D. Coleman; "An investigation of the NO/H2/O2 reaction on noble-metal catalysts at low temperatures under lean-burn conditions"; Applied Catalysis B: Environmental 23 (1999); May 23, 1999; 115-121; 1999 Elsevier Science B.V.

C. Costa, et al.; :An Investigation of the NO/H2/O2 (Lean De-NOx) Reaction on a Highly Active and Selective Pt/La0.7Sr0.2Ce0.1FeO3 Catalyst at Low Temperatures; Journal of Catalysis 209; Apr. 23, 2002; 456-471; 2002 Elsevier Science (USA).

C. N. Costa, A. M. Efstathiou; "Low-temperature H2-SCR of NO on a novel Pt/MgO—CeO2 catalyst"; Applied Catalysis B: Environmental 72 (www.sciencedirect.com); Nov. 14, 2006; 240-252; 2006 Elsevier B.V.

M. Machida, S. Ikeda, D. Kurogi, and T. Kijjima; "Low temperature catalytic NOx-H2 reactions over Pt/TiO2—ZrO2 in an excess oxygen"; Applied Catalysis B: Environmental 35; Jul. 13, 2001; 107-116; 2001 Elsevier Science B.V.

* cited by examiner

SELECTIVE CATALYTIC REDUCTION SYSTEM AND PROCESS FOR TREATING NOX EMISSIONS USING A PALLADIUM AND RHODIUM OR RUTHENIUM CATALYST

CROSS REFERENCE TO RELATED APPLICATIONS

This application is a continuation-in-part of U.S. patent application Ser. No. 12/472,633, filed May 27, 2009, now U.S. Pat. No. 7,744,840, which is a continuation-in-part of U.S. patent application Ser. No. 12/122,116, filed May 16, 2008, now U.S. Pat. No. 7,718,153 the entirety of which is hereby incorporated by reference.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to a catalytic process for the reduction of nitrogen oxides ($NO_x$) in combustion exhaust by selective catalytic reduction (SCR) using hydrogen ($H_2$) as the reducing agent. The present invention also relates to the field of power generation, and more particularly to the control of $NO_x$ emissions produced during combustion of a fuel containing hydrogen to generate power, and specifically to the catalytic treatment of exhaust gases from a gas turbine at a coal gasification plant. However, the invention may also be employed in $NO_x$ abatement from other sources, such as emissions generated during manufacture of nitric acid, within internal combustion engines and the like.

BACKGROUND OF THE INVENTION

Coal-based integrated gasification combined cycle plant (IGCC) technology enables production of electricity with a gas turbine utilizing a fuel that is rich in hydrogen and has a very limited amount of $CO_2$. Combustion of the hydrogen ($H_2$)-containing fuel requires an oxidizing source such as air, which contains nitrogen ($N_2$). As a result, a by-product in exhaust gas stemming from hydrogen-containing fuel combustion is a significant amount of $NO_x$. The $NO_x$ in the exhaust gas may be reduced by using selective catalytic reduction (SCR) systems along with low $NO_x$ combustors in the gas turbine. Since fuel produced and used at an IGCC plant contains hydrogen ($H_2$), the fuel may also provide $H_2$ as a reducing agent in the SCR process by introducing a small amount of $H_2$ from the fuel supply into the SCR system. The use of $H_2$ as a $NO_x$ reducing agent enables the elimination of typical reducing agents such as, for example, ammonia ($NH_3$) and urea ($N_2H_6CO$) in the SCR system, and thus prevents discharge of ammonia slip into the ambient air, which is an inherent problem with current ammonia-based SCR technology.

Recently, improvements in $H_2$-SCR efficiency with respect to $NO_x$ removal and $N_2$ selectivity under oxidizing conditions were made in U.S. patent application Ser. Nos. 12/122,116 and 12/472,633, the entirety of each of which is hereby incorporated by reference. As described in U.S. patent application Ser. No. 12/472,633, for example, a palladium (Pd) catalyst comprising pre-sulfated zirconia support particles, palladium, a pre-sulfated zirconia binder, and tungsten (as a promoter) showed a substantial increase in $NO_x$ reduction efficiency and durability over a platinum (Pt) catalyst that was disclosed in U.S. Pat. No. 7,105,137, for example, under gas turbine exhaust conditions. Further improvements in $H_2$-SCR efficiency with respect to $NO_x$ removal and $N_2$ selectivity under oxidizing conditions are needed, as well as improvements in the durability of $H_2$-SCR catalysts.

BRIEF DESCRIPTION OF THE DRAWINGS

The invention is explained in the following description in view of the drawings that show.

DETAILED DESCRIPTION OF THE INVENTION

The present inventors have surprisingly found that the combination of palladium (Pd) metal catalyst and an additional second catalytic noble metal component (SCNMC), which may be rhodium (Rh), ruthenium (Ru), or a mixture thereof, significantly increases the durability of a Pd-based catalyst system having a pre-sulfated zirconia binder during its exposure to a sulfur and water-containing gas stream. Thus, in accordance with one aspect of the present invention, there is provided a process for the catalytic reduction of nitrogen oxides ($NO_x$) in a gas stream in the presence of $H_2$ using a catalyst system having Pd as well as Rh, Ru, or a mixture thereof (Rh and Ru). The process comprises contacting the gas stream with a catalyst system comprising zirconia-silica washcoat particles, a pre-sulfated zirconia binder, a catalyst combination comprising palladium and at least one of rhodium, ruthenium, or a mixture of rhodium and ruthenium. In one embodiment, the SCNMC is present in the catalyst system in a concentration less than that of palladium. While not wishing to be bound by any particular theory, it is believed that addition of Rh or Ru to a Pd-based catalyst system helps to reduce the oxidation activity of the catalyst and consequently decreases the oxidation of $H_2$ to water, thereby making greater concentrations of $H_2$ available to the process throughout the length of the catalyst bed to facilitate the reduction of NOx in the presence of $H_2$ to produce $N_2$ and water.

Figure 1:
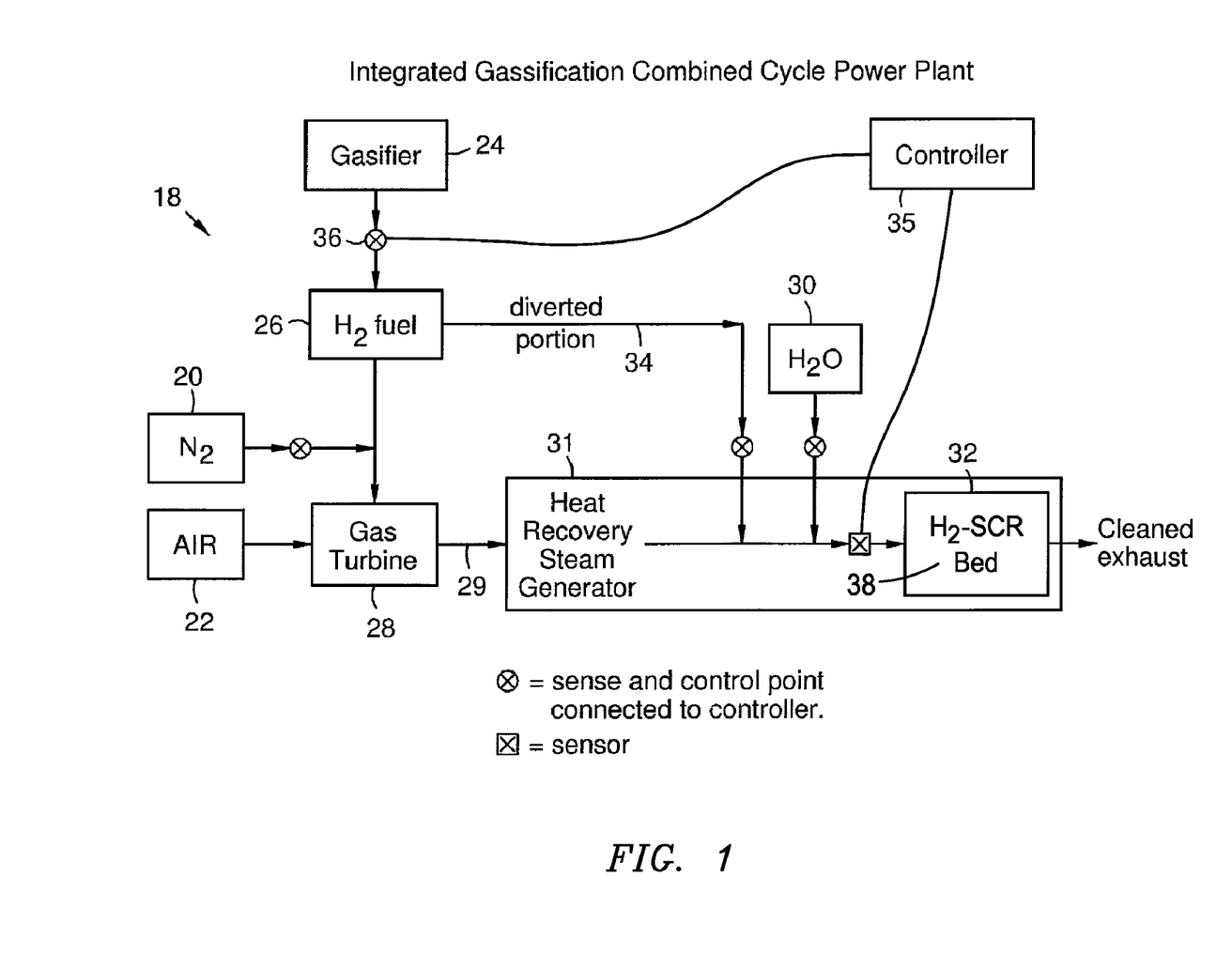
FIG. 1 is a schematic view of an integrated gasification combined cycle power plant in accordance with an aspect of the present invention.

Now referring to the figures, FIG. 1 illustrates an integrated gasification combined cycle power plant system 18 that produces an $H_2$-containing fuel 26 (syngas, or $H_2$-rich fuel after $CO_2$ capture) using a gasification process at gasifier 24. The $H_2$-containing fuel 26 is diluted with nitrogen 20, and combined with air 22 for combustion in a gas turbine 28. In one embodiment, the system 18 or gasifier 24 produces an $H_2$-containing fuel 26 containing at least 10 vol. % $H_2$ and at least 10 vol. % $N_2$. Turbine exhaust gas 29 is directed to a heat recovery steam generator (HRSG) 31, which includes or is otherwise located upstream of a catalytic bed, e.g., an $H_2$ selective catalytic reduction bed ($H_2$-SCR bed) 32, that is positioned at a location suitable for a desired SCR temperature operating range. The exhaust gas 29 passes to the $H_2$-SCR bed 32, where one or more $NO_x$ reduction catalyst layers of the $H_2$-SCR 32 promote the destruction of $NO_x$ by a reducing agent, such as for example $H_2$, producing primarily $N_2$ and $H_2O$. A diverted portion 34 of the $H_2$-containing fuel 26 may be used as a reducing agent for the $NO_x$ reduction reaction in the $H_2$-SCR bed 32. A water injection system 30 may be used to improve $NO_x$ reduction reactions within the $H_2$-SCR bed 32. A controller 35 is connected to sensors and valves 36 to sense and control the process. The $H_2$-SCR bed 32 comprises a catalyst system 38 described in fuller detail below having long-term stability when exposed to an exhaust gas, e.g., exhaust gas 29, having high contents of oxygen, water, and sulfur.

In one embodiment, the $H_2$-SCR bed 32 is in a geometric form that allows for high $NO_x$ reduction efficiency along with a minimal pressure drop. Although beads, extrudates, etc. are suitable geometric forms employed in commercial applications, a monolith is a preferred form. The monolithic form and the use of a monolith as a catalyst carrier are well known to one skilled in the art. A monolith consists of a series of straight, non-interconnecting channels. Onto the walls of the monolith are coated a thin layer of a catalyst-containing material, termed "washcoat" by the trade. It is within the pores of the washcoat that the catalytically active metals, binder, and promoter (when present) are located. Thus, in one embodiment, a honeycomb monolith may be washcoated with the catalyst system 38 of the present invention as described herein.

Figure 2:
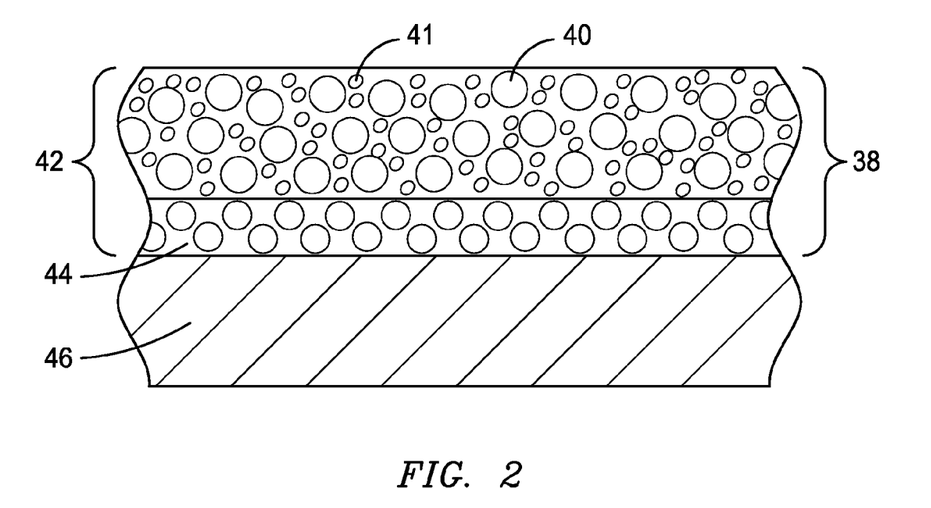
FIG. 2 is an embodiment of a catalyst system in accordance with an aspect of the present invention.

As shown in FIG. 2, in one embodiment, the catalyst system 38 comprises a washcoat 42 comprising a catalyst combination 40, washcoat particles 41, and a pre-sulfated zirconia binder 44. The catalyst combination 40 is impregnated within or is otherwise associated with the washcoat particles 41. While FIG. 2 depicts the pre-sulfated zirconia binder 44 as a distinct layer for ease of reference, it is understood that the pre-sulfated zirconia binder 44 may be uniformly distributed throughout the washcoat 42. The pre-sulfated zirconia binder 44 enables the washcoat 42 containing the catalyst combination 40 to be bound to the monolithic substrate 46. Furthermore, the components of the catalyst system 38 may in reality have a more uniform and integrated appearance.

As was shown in U.S. patent application Ser. Nos. 12/122, 116 and 12/472,633, the entirety of each of which is incorporated by reference, a palladium (Pd) catalyst showed a substantial increase in $NO_x$ reduction efficiency over a platinum (Pt) catalyst disclosed in U.S. Pat. No. 7,105,137, for example, under gas turbine exhaust conditions. It was previously found in U.S. Pat. No. 7,105,137 that platinum (Pt) catalysts with different supports ($Al_2O_3$, MgO, $TiO_2$, $CeO_2$, $Y_2O_3$, etc.), have a relatively high selectivity to $N_2O$, which is an undesirable pollutant. Advantageously, a Pd catalyst is not only resistant to water in a process stream, but the water may actually have a positive influence on the palladium catalyst performance in a range of concentrations up to about 25 vol. %, especially between 15-23 vol. %, and preferably between 17-21 vol. %, with a peak at about 20 vol. %. Further increase of water concentrations above about 20 vol. % may cause a slight decrease of the catalyst system's performance with respect to $NO_x$ emissions.

As noted above, the present inventors have found that the incorporation of a second catalytic noble metal component (SCNMC), e.g., rhodium, ruthenium, or a mixture thereof, in addition to palladium (a first catalytic noble metal component) significantly increases the durability of a sulfated catalyst system during its exposure to high sulfur and water-containing gas streams, e.g., a $SO_2$ and $H_2O$ containing gas stream in the exhaust downstream of the gas turbine at IGCC plant. Thus, in the present invention, the catalyst combination 40 comprises a first catalytic metal component (palladium) and a second catalytic metal component (SCNMC), which is at least one of rhodium, ruthenium, or a mixture of rhodium and ruthenium.

The catalyst combination 40 may comprise palladium in an amount between 0.01 and 2.0 wt. % of the catalyst system. It is noted that the terms "% mas," "wt %," and "% by wt." are intended to be used interchangeably herein. Typically, the SCNMC (Ru, Rh, or mixture thereof) of the catalyst combination is present in concentrations less than that of palladium (Pd). In one embodiment, the catalyst combination 40 comprises Pd and Rh and a mass ratio of Pd to Rh in the catalyst system 38 is between 0.5 and 15, and in a particular embodiment, is from 7.5:1 to 10:1. In another embodiment, the catalyst combination 40 comprises Pd and Ru and a mass ratio of Pd to Ru in the catalyst system 38 is between 0.5 and 20, and in a particular embodiment, a mass ratio of Pd to Ru is from 7.5:1 to 15:1. In yet another embodiment, the catalyst combination comprises Pd and a mixture of Rh and Ru. The ratio of Rh and Ru in the mixture in this embodiment may be any desired ratio and the mass ratio of the Pd to the Ru/Rh mixture may be from 0.5:1 to 20:1. Any suitable palladium, rhodium, or ruthenium source may be utilized to provide the combination catalyst 40, such as palladium nitrate, rhodium nitrate, and ruthenium nitrate or ruthenium (III) nitrosyl nitrate.

Figure 3:
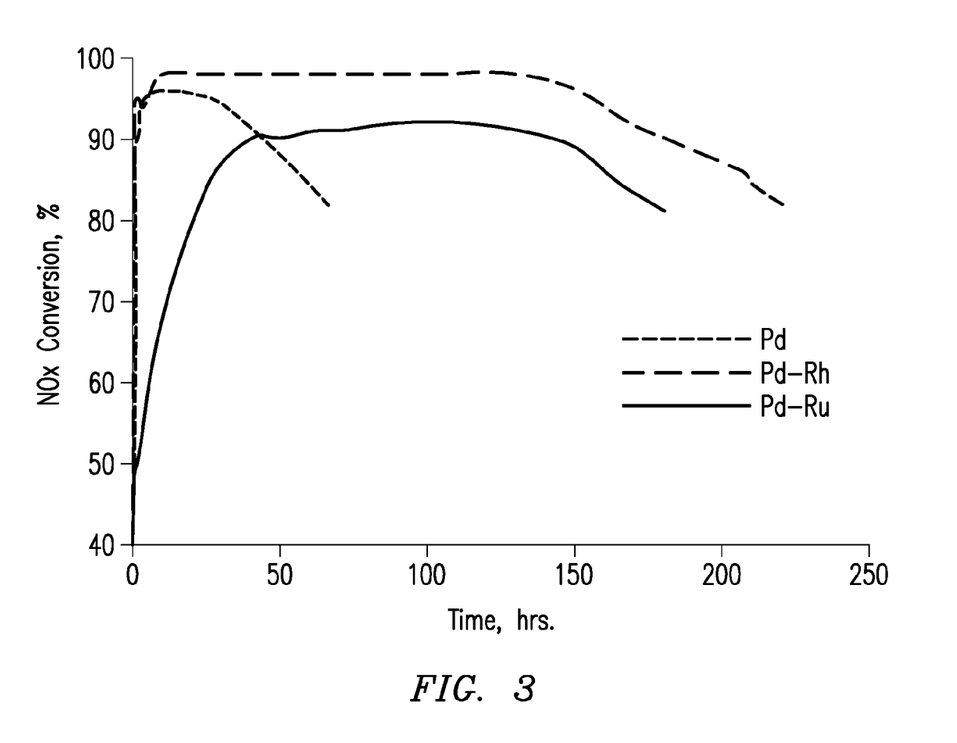
FIG. 3 is a graph showing the effect of an addition of Ru and Rh to the Pd/W catalyst system on $NO_x$ reduction efficiency in accordance with an aspect of the present invention (Pd/Ru mass ratio=15; Pd/Rh mass ratio=10; 100 ppm $SO_2$ and 20 vol. % water in the gas stream, $NO_x/H_2$ molar ratio=40)

FIG. 3 specifically shows a significant improvement in durability of the developed catalyst system that is achieved by utilizing a catalyst system with addition of an SCNMC (Rh and Ru) prepared according to the procedure described under Examples 2 and 3 below. The improved catalyst formulations comprising pre-sulfated zirconia support particles, palladium, and a pre-sulfated zirconia binder with an addition of the SCNMC (Rh or Ru) allow for further stable operation of the catalyst system with a $NO_x$ conversion rate of greater than 85% for a notably longer duration than the same catalyst system having Pd only. For example, the use of Rh as a SCNMC with a mass ratio of Pd/Rh=10 during exposure of such catalytic system 38 to gaseous flow with composition of NOx 10 ppm, $SO_2$ 100 ppm, NOx/$H_2$ molar ratio=40 and $H_2O$ 20 vol. % leads to the increased durability (by maintaining 85+% NOx reduction) of the catalyst system from 65 hours (for a Pd only system) to 220 hours. Similarly, the incorporation of Ru as a SCNMC into the catalyst system 38 also allows an increase of durability of the catalyst system 38 by a factor of 2.5 (mass ratio Pd/Ru=10). Since the testing of durability of the catalyst systems described herein require a significant amount of time to evaluate the catalyst effectiveness, a modified testing procedure was employed. The procedure known as "accelerated aging" was applied to all catalytic samples by introducing the catalytic blocks into a gaseous stream containing $NO_x$ and having increased (100 ppm) concentration of $SO_2$ along with 20 vol. % of $H_2O$.

Figure 4:
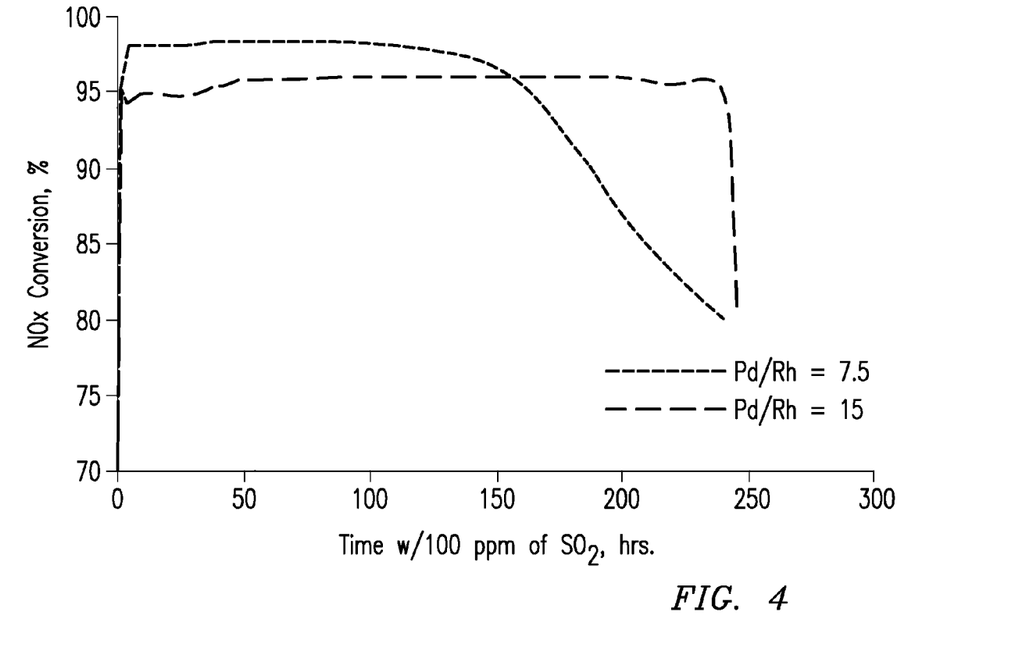
FIG. 4 is a graph showing the effect of concentration of Rh in the Pd/W catalyst system on $NO_x$ reduction efficiency in accordance with an aspect of the present invention (Pd/Rh mass ratio=7.5 and 15; 100 ppm $SO_2$ and 20 vol. % water in the gas stream, $NO_x/H_2$ molar ratio=40)

The influence of specific concentrations of Ru and Rh on NOx removal efficiency is illustrated in Table 1 (Ru) below and FIG. 4 (Rh).

TABLE 1

Effects of concentration of Ru on the conversion of NOx and the catalyst durability using a Pd/Ru/W/($ZrO_2$—$SiO_2$)$SO_4$ catalyst system.

| Hours of operation | Pd/Ru mass Ratio = 7.5 | Pd/Ru mass Ratio = 15.0 |
|---|---|---|
| 10 hrs | 35% | 44% |
| 20 hrs | 65% | 77% |
| 40 hrs | 81% | 72% |
| 50 hrs | 81.0% | 81% |
| 100 hrs |  | 92% |
| 150 hrs |  | 91% |
| 180 hrs |  | 86% |
| 200 hrs |  | 80% |

[NOx] = 10 ppm, [$H_2O$] = 20%, [$SO_2$] = 100 ppm, NOx/$H_2$ molar ratio = 80.

As can be seen from the results of Table 1, catalyst systems employing a Pd/Ru catalyst combination 40 improve the durability of the catalyst system with higher than an 85% reduction efficiency of $NO_x$ even in the presence of a high concentration of $SO_2$ (100 ppm) and water (20% by vol.). The present inventors found it remarkable that such significant improvement comes in the cases when concentration of Ru is very low (Pd/Ru mass ratio of 7.5:1 and 15:1). Similarly, referring to FIG. 4, catalyst systems employing a Pd/Rh catalyst combination also show marked durability even in the presence of a high concentration of $SO_2$ (100 ppm) and water (20% by vol.). The inventors also found that an increase in the mass ratio of Pd/Rh from 7.5:1 to 15:1 results in improved catalyst durability while maintaining a $NO_x$ removal efficiency at the level of 85+% after 240 hours of accelerated aging.

Figure 5:
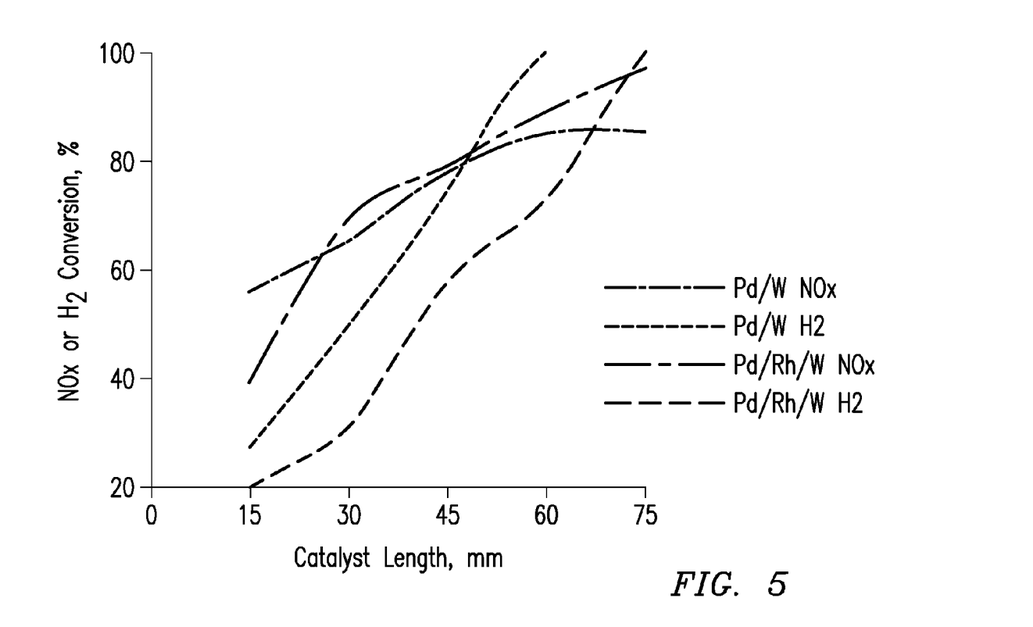
FIG. 5 is a graph showing changes in $NO_x$ removal efficiency and $H_2$ consumption along the length of the catalytic bed for sulfated Pd/W and Pd/Rh/W catalyst systems in accordance with an aspect of the present invention (Pd/Rh mass ratio=10; 100 ppm SO2 and 20 vol. % water in the gas stream, $NO_x/H2$ molar ratio=40).

While not wishing to be bound by any particular theory, it is believed that the addition of SCNMCs, such as Rh, Ru, or a mixture thereof, to Pd catalyst systems helps to reduce the oxidation activity of the catalyst and consequently decreases the oxidation of $H_2$ to water, thereby making greater concentrations of $H_2$ available for a $NO_x$ removal process throughout the length of the catalyst bed comprising the catalyst system 38. As a result, as shown in FIG. 5, more hydrogen is available in the reaction zone to facilitate the reduction of $NO_x$ in the presence of $H_2$ to produce $N_2$ and water. For example, $H_2$ conversion at the beginning of a latter portion of the Pd/Rh/W catalyst system is about 80% leaving 20% of hydrogen to be available for continuation of the reaction to convert NOx to $N_2$ and $H_2O$. At the same time, for the Pd/W catalyst system, at a latter portion of the catalyst system, there is no $H_2$ available for the reduction reaction.

In addition to the catalyst combination 38, the washcoat 42 also comprises sulfated-zirconia washcoat particles 41, which may be sulfated-zirconia or sulfated-zirconia-silica oxides (e.g., ($ZrO_2$)$SO_4$ or ($ZrO_2$—$SiO_2$)$SO_4$), for example. In one embodiment, the washcoat particles 41 comprise ($ZrO_2$—$SiO_2$)$SO_4$ particles and the ratio of $SiO_2$ to $ZrO_2$ is approximately 1:2 by weight. In another embodiment, the washcoat particles 41 comprise ($ZrO_2$—$SiO_2$)$SO_4$ particles and the mass ratio of $SiO_2$ to ($ZrO_2$+$SiO_2$) in the catalyst system 38 is between 0.05 and 0.90, and in another embodiment is between 0.25 and 0.50. The sulfated zirconia or zirconia-silica washcoat particles 41 may be prepared by the methods set forth in U.S. patent application Ser. No. 12/472, 633, for example, which has been incorporated by reference in its entirety herein.

It is understood by one skilled in the art that catalytic materials may diffuse partly into or throughout the substrate to which the washcoat is applied (e.g., a monolith), thus blurring the interface between the washcoat and the substrate. However, "washcoat" is nevertheless a useful term because it indicates a region of catalytic material at the surface of a catalytic bed in which certain percentages by weight apply.

The catalyst system 38 also advantageously comprises a pre-sulfated zirconia binder 44. Binders are typically used to adhere the solid catalyst support material to the monolithic substrate. Exemplary conventional binders include clays, aluminas, silicas, zirconias, etc. As set forth in the disclosure of U.S. patent application Ser. No. 12/472,633, the present inventors found that the use of a pre-sulfated zirconia binder over conventional binders significantly improves the long-term durability of a Pd-based SCR catalyst system when the catalyst system is used for the reduction of nitrogen oxides ($NO_x$) in a sulfur-containing gas stream. By "pre-sulfated" as used herein, it is meant that the sulfated binder (44) is incorporated into the catalyst system 38 during preparation and prior to exposing the catalyst system 38 to a flowing sulfur-containing gas stream. Sulfur-containing gas streams include exhaust gases from a gas turbine power generating station at a coal gasification plant. Such exhaust gas streams typically comprise $NO_x$, $H_2O$, $O_2$, and $SO_2$. In one embodiment, the pre-sulfated zirconia binder 44 comprises sulfuric acid-treated zirconia ($ZrO_2$). The mass ratio of the pre-sulfated zirconia binder 44 to the catalyst system 38 may be between 0.001 and 0.04 and the atomic S/Zr ratio in the catalyst system 38 may be between 0.01 and 0.15.

In one embodiment, the catalyst system 38 further comprises a promoter. The promoter may comprise one of tungsten, zinc, titanium, and combinations thereof, for example. In one embodiment, the promoter is tungsten and the tungsten loading is in the range of from 0.5 to 5.0 wt. % of the catalyst system 38. Advantageously, the addition of a small amount of a promoter also helps to reduce the oxidation efficiency of the catalyst 40 and consequently decreases the oxidation of $H_2$ to water, thereby making greater concentrations of $H_2$ available to the process throughout the length of the catalytic bed comprising the catalyst system 38. As a result, more $H_2$ is available to facilitate the reduction of $NO_x$ in the presence of $H_2$ to produce $N_2$ and water.

The following description discusses the operation of the above-described catalyst system 38 for removing $NO_x$ from a predetermined gas stream. In one embodiment of a process for the catalytic reduction of nitrogen oxides ($NO_x$) in a gas stream in the presence of $H_2$, the process comprises contacting the gas stream with a catalyst system 38 comprising a catalyst combination 40 of palladium and at least one of ruthenium, rhodium, or a mixture thereof (Rh/Ru), washcoat particles 41 (e.g., sulfated zirconia washcoat particles), and a pre-sulfated zirconia binder 44. In a particular embodiment and referring again to FIG. 1, a catalytic bed, e.g., $H_2$-SCR bed 32, comprising the catalyst system 38 may be installed in a flow path of an exhaust gas stream 29 of a gas turbine 28 and the exhaust gas stream 29 comprises $NO_x$, $H_2O$, $O_2$, and $SO_2$. For example, the catalytic bed 32 comprising the catalyst system 38 may be installed in the flow path of exhaust gas 29 of the gas turbine 28 in an integrated gasification combined cycle (IGCC) power generation plant system 18 that synthesizes a hydrogen-containing fuel 26 for the gas turbine 28. In this embodiment, the process comprises diverting a portion of the hydrogen-containing fuel 26 to supply the $H_2$ as a $NO_x$ reducing agent for the catalytic bed 32. In addition, the process comprises maintaining a water content 30 in the exhaust gas 29 to a concentration of about 15-25 vol. %, and in one embodiment from 17-20 vol. % and maintaining the diverted portion 34 of the hydrogen-containing fuel 26 into the exhaust gas 29 between the gas turbine 28 and the catalytic bed 32 at a molar ratio for $H_2/NOx$ in the range of 10-100 in the exhaust gas 29. In one embodiment, the molar ratio of $H_2/NOx$ is from 40-80. Lastly, the process comprises passing the exhaust gas 29 over the catalytic bed 32 at a temperature between 70-250° C. to reduce an amount of $NO_x$ from the exhaust gas 29.

When it is desired to operate the catalyst system 38 at low temperatures, for example at temperatures less than about 200° C., the catalyst combination 40 (e.g., Pd plus Rh, Ru, or a mixture of Rh and Ru) may be activated by flowing an oxygen-containing gas over the catalyst 40 (prior to operation) at a temperature sufficient to oxidize any residue (e.g., carbon or carbon-containing compounds) associated with the catalyst metal precursors. This is because while calcining the catalyst combination 40 in the monolithic form, there is little, if any, flow through the channels of the monolith. As a result, the metal precursors are decomposed, but a portion of the decomposition residue still remains on the surface of the catalyst combination 40, potentially inhibiting the activity of the resulting catalyst during start-up and periods of operation. Further, as a result, the catalyst combination 40 must be "activated" prior to use by heating to a temperature sufficient to oxidize the residue, thereby removing the residue from the surface of the catalyst combination 40. Typically, this temperature is greater than about 200° C. The activation temperature is critical because the normal operating temperature of the catalyst combination 40, typically on the order of 120° C., is not sufficient to readily oxidize this residue.

The catalyst system 38 is very stable with deactivation over extended periods of time, and demonstrates a high $NO_x$ reduction efficiency, even in the presence of up to 50 ppmv of $SO_2$, an $O_2$ content of 1-20 vol. %, an $H_2/NO_x$ molar ratio of 10-100, and water up to 25 vol. %. Moreover, the use of a pre-sulfated zirconia binder and a Pd/Rh, Pd/Ru, or Pd/Rh/Ru catalyst dramatically improves the durability of the catalyst system 38, which presents an opportunity to achieve high $NO_x$ removal efficiency from $NO_x$-containing gas streams for longer periods of time.

$H_2$-SCR processes using a Ru or Rh-containing catalyst system as described herein provide from 90% to greater than 97% $NO_x$ reduction efficiency in a simulated gas turbine exhaust gas by using hydrogen as a reducing agent in a temperature range of 70° C. to 250° C., preferably between 100-140° C., with a process stream comprising up to 50 ppmv of $SO_2$, an $O_2$ content of 1-20 vol. %, and water up to 25 vol. %. Hydrogen is mixed with the simulated exhaust gas to achieve a molar ratio for $H_2/NO_x$ in the exhaust gas of 10 to 100, and preferably about 40 to 80 for optimal $NO_x$ reduction efficiency. The $H_2/NO_x$ ratio will depend on several factors that include, but are not limited to, the concentration of $NO_x$ in the process stream, the operating temperature, the exhaust space velocity, and the desired level of $NO_x$ reduction.

Introducing water into the gas stream, e.g., the exhaust gas stream 29, downstream of the gas turbine 28 can improve the $NO_x$ reduction efficiency of the present catalyst 40 should insufficient water (less than about 20%) be present in the exhaust gas. Thus, water content may be used as an active parameter to increase $NO_x$ removal. For example, steam can be mixed with the $H_2$ stream and injected through an $H_2$ distribution grid upstream of the $H_2$-SCR bed 32. This configuration also allows for additional water to be added to the process stream when additional water is needed to achieve the target $NO_x$ reduction efficiency. However, there comes a point above about 20% $H_2O$ vol. % when additional water actually causes a decrease in the $NO_x$ removal efficiency. In one embodiment, the range of $H_2O$ is about 15-23 vol. %, and in a particular embodiment, is from about 17-21 vol. %. It is believed that the addition of water into the process stream up to a certain level allows for reducing the $H_2$ oxidation rate according to the LeChatelier's principle. The further increase of water concentration in the exhaust is believed to reduce $NO_x$ removal efficiency due to blockage of some of the active sites.

The temperature of the $H_2$-SCR bed 32 may be maintained in a desirable range by choosing the appropriate location for the $H_2$-SCR bed 32 in the HRSG 31 and by controlling the amount of heat removed by heat exchanged surfaces within the HRSG 31 as is known in the art. The exhaust temperature may be further adjusted to the optimum by temperatures and amounts of injected $H_2O$ and diverted hydrogen fuel. A lower boundary of an operational temperature range may be established above a dew point temperature in the exhaust stream. The dew point depends upon the concentration of $H_2O$ and other constituents (e.g., $SO_2/SO_3$) of the exhaust stream and its pressure. Operation above the dew point will avoid water condensation in the $H_2$-SCR bed 32 and in post-$H_2$-SCR bed 32 areas. This restricts an operation of the $H_2$-SCR bed 32 at the temperatures below 110-120° C. in some exhaust conditions where high $SO_2$ and $SO_3$ levels are present.

Although the above invention was described in the context of the power generation field, with specific emphasis on the treatment of gas turbine exhaust, the novel process as described herein may be applied to other $NO_x$ pollution sources, such as for example nitric acid plants and stationary emissions sources, with different system configurations.

The below examples are provided to illustrate certain aspects of the present invention and are not intended to be limiting in any respect.

Example 1

This example illustrates a method of synthesis of a Pd-based catalyst supported with pre-sulfated zirconia binder on $ZrO_2$—$SiO_2$ washcoat particles to form a Pd/W/($ZrO_2$—$SiO_2$)$SO_4$ catalyst system with approximately 0.75-1.0 wt. % Pd. To arrive at this catalyst system, 4.5 kg of zirconium hydroxide were added to a 5 gallon pail with 4.5 L of deionized (DI) water and 750 g of a colloidal silica solution (40% $SiO_2$). The pH of the zirconium hydroxide/silica solution was adjusted to about 3.0 with sulfuric acid and mixed overnight. The following morning, the solution was emptied into a pan and placed in an oven to dry at 110° C. to evaporate excess water. Once dried, the resulting zirconia-silica-sulfate material was crushed below 40-mesh and calcined at 650° C. for 2 hrs.

The washcoat with binder was prepared by adding 21 g of the zirconia-silica-sulfate material, 21 g of a zirconium oxynitrate solution (20% $ZrO_2$), 0.266 g ammonium meta-tungstate (Aldrich,) and 50 mL of DI water to a beaker. Monolith cores (230 cells per square inch (cpsi)) were dipped in the slurry with excess slurry blown from the channels using an air knife. Catalyst cores were calcined at 450° C. for 1 hour. The washcoat loading was approximately 110 g per liter of monolith. After calcining, the cores were cooled and dipped into a solution of 2 g sulfuric acid in 98 g DI water yielding a 1.98% sulfuric acid loading (2% sulfuric acid per washcoat). Blocks were then dried in a microwave and calcined at 650° C. for 2 hours.

Thereafter, a palladium metal solution was prepared by adding to a beaker: 8.165 g palladium chloride solution (8.94-9.35% Pd by wt.); 2.2 g TEA (triethanolamine); and sufficient DI water to yield a 100 g total solution weight. The previously dipped monolith blocks were dipped in the palladium metal solution yielding a 0.78% Pd loading by washcoat (catalyst system) weight. Excess solution was blown from the channels using an air knife. Blocks were dried in a microwave oven for 2-10 minutes and then calcined at 450° C. for 2 hours to decompose the palladium complex.

Example 2

This example illustrates a method of synthesis of a Pd/Rh-based catalyst supported with pre-sulfated zirconia binder on $ZrO_2$—$SiO_2$ to form a Pd/Rh/W/($ZrO_2$—$SiO_2$)$SO_4$ catalyst system with approximately 0.75-1.0 wt % Pd and 0.0075-0.11 wt % Rh. To arrive at this catalyst system, 4.5 kg of zirconium hydroxide was added to a 5 gallon pail with 4.5 L of DI water and 750 g of a colloidal silica solution (40% $SiO_2$). The pH of the zirconium silica solution was adjusted to 3.0 with sulfuric acid (Aldrich) and mixed overnight. The following morning, the solution was emptied into a pan and placed in an oven to dry at 110° C. Once dried, the resulting zirconia-silica-sulfate material was crushed below 40-mesh and calcined at 650° C. for 2 hrs.

The washcoat was prepared by adding 25 g of the zirconium-silica-sulfate material, 25 g of a zirconium oxynitrate solution (20% $ZrO_2$), 1.667 g ammonium metatungstate (Aldrich) and 50 mL of DI water to a beaker. Monolith cores (300 cpsi) were dipped in the slurry to achieve a loading of 181 g/L washcoat. Catalyst cores were calcined at 450° C. for 1 hour. After calcination, the cores were cooled and dipped into a of 2 g sulfuric acid in 100 g DI water yielding a 1.6% sulfuric acid loading (per washcoat). Blocks were then microwaved dry and calcined at 450° C. for 2 hours.

A combined palladium/rhodium (Pd/Rh) metal solution was made by adding to a beaker: 15.42 g of a palladium nitrate solution (6.47% Pd), 1.0 g of rhodium nitrate, 2.8 g TEA (triethanolamine) and sufficient DI water to yield a 75 g total solution weight. The previously dipped monolith blocks were dipped in the Pd/Rh solution yielding a 0.9% Pd and 0.075-0.11% Rh loading by washcoat weight. Blocks were microwaved dry for 2-10 minutes and then calcined at 450° C. for 2 hours.

Example 3

This example illustrates a method of synthesis of a Pd-based catalyst supported with pre-sulfated zirconia binder on $ZrO_2$—$SiO_2$ to form a Pd/Ru/W/($ZrO_2$—$SiO_2$)$SO_4$ catalyst system with approximately 0.75-1.0 wt. % Pd and 0.0075-0.11 wt. % Ru. To arrive at this catalyst system, 4.5 kg of zirconium hydroxide was added to a 5 gallon pail with 4.5 L of DI water and 750 g of a colloidal silica solution (40% $SiO_2$). The pH of the zirconium silica solution was adjusted to 3.0 with sulfuric acid (Aldrich) and mixed overnight. The following morning, the solution was emptied into a pan and placed in an oven to dry at 110° C. to evaporate excess water. Once dried, the resulting zirconia-silica-sulfate material was crushed below 40-mesh and calcined at 650° C. for 2 hrs.

The washcoat was prepared by adding 25 g of the zirconium-silica-sulfate material, 25 g of a zirconium oxynitrate solution (20% $ZrO_2$), 1.667 g ammonium metatungstate (Aldrich), and 50 mL of DI water to a beaker. The monolith cores (300 cpsi) were dipped in the slurry to achieve a loading of 168 g/L washcoat. Catalyst cores were calcined at 450° C. for 1 hour. After calcinations, the cores were cooled and dipped into a solution of 2 g sulfuric acid in 100 g DI water yielding a 1.7% sulfuric acid loading (per washcoat). Blocks were then microwaved dry and calcined at 450° C. for 2 hours.

A combination palladium/ruthenium (Pd/Ru) metal solution was made by adding to a beaker: 15.42 g of a palladium nitrate solution (6.47% Pd); 6.5 g of a ruthenium (III) nitrosyl nitrate solution (1.5% Ru); and 2.8 g TEA (triethanolamine), and sufficient DI water to yield a 75 g total solution weight. The previously dipped monolith blocks were dipped in said solution yielding a 0.8% Pd and a 0.11% Ru loading by washcoat weight. Blocks were microwaved dry and then calcined at 450° C. for 2 hours.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for catalytic reduction of nitrogen oxides ($NO_x$) in a gas stream in the presence of $H_2$ comprising contacting the gas stream with a catalyst system comprising zirconia-silica washcoat particles, a pre-sulfated zirconia binder, and a catalyst combination comprising palladium and at least one of rhodium, ruthenium, or a mixture of rhodium and ruthenium.

2. The process according to claim 1, wherein said catalyst combination comprises palladium and rhodium, and wherein a mass ratio of palladium to rhodium in the catalyst system is between 0.5 and 20.

3. The process according to claim 2, wherein said mass ratio of palladium to rhodium in the catalyst system is between 7.5 and 15.

4. The process according to claim 1, wherein said catalyst combination comprises palladium and ruthenium, and wherein a mass ratio of palladium to ruthenium in the catalyst system is between 0.5 and 20.

5. The process according to claim 4, wherein said mass ratio of palladium to ruthenium in the catalyst system is between 7.5 and 15.

6. The process according to claim 1, wherein said catalyst system comprises palladium and a mixture of rhodium and ruthenium, and wherein a mass ratio of palladium to the mixture of rhodium and ruthenium in said catalyst system is from 0.5:1 to 20:1.

7. The process according to claim 1, wherein a loading of the palladium is from 0.01 to 2.0% by wt. of the catalyst system, and wherein the catalyst system further comprises a promoter.

8. The process according to claim 1, wherein the sulfated zirconia washcoat particles comprise at least one of ($ZrO_2$)$SO_4$ or ($ZrO_2$—$SiO_2$)$SO_4$.

9. The process according to claim 1, wherein a catalytic bed comprising the catalyst system is installed in a flow path of an exhaust gas stream of a gas turbine, and wherein the exhaust gas stream includes $NO_x$, $H_2O$, $O_2$, and $SO_2$.

10. The process according to claim 9, wherein $H_2O$ and hydrogen are injected into the exhaust gas between the gas turbine and the catalytic bed, to a concentration of about 5-25 vol. % $H_2O$ and a molar ratio for $H_2/NO_x$ in the range of 10 to 100 in the exhaust gas.

11. The process according to claim 9, wherein the exhaust gas is passed over the catalytic bed at a temperature maintained in a range of 100-140° C.

12. The process according to claim 9, wherein the catalytic bed is installed in the flow path of the exhaust gas of the gas turbine in an integrated gasification combined cycle (IGCC) power generation plant that synthesizes a hydrogen-containing fuel for the gas turbine, and further comprising:

diverting a portion of the hydrogen-containing fuel to supply the $H_2$ as a $NO_x$ reducing agent for the catalytic bed;

maintaining a water content in the exhaust gas to a concentration of about 15-25 vol. % and maintaining the diverted portion of the hydrogen-containing fuel into the exhaust gas between the gas turbine and the catalytic bed at a molar ratio for $H_2/NOx$ in the range of 10-100 in the exhaust gas; and passing the exhaust gas over the catalytic bed at a temperature between 70-250° C. to remove an amount of $NO_x$ from the exhaust gas.

13. The process according to claim 12, wherein the water content is maintained to a concentration of about 17-21 vol. %.

14. A system for implementing a process for selective catalytic reduction of nitrogen oxides ($NO_x$) in an exhaust gas from a gas turbine in an integrated gasification combined cycle power plant, comprising:

a fuel gas synthesizer that produces a fuel gas containing at least 10 vol. % $H_2$ and at least 10 vol. % nitrogen;

a gas turbine that burns a portion of the fuel gas, producing the exhaust gas;

a catalytic bed installed in a flow path of the exhaust gas, the catalytic bed comprising a catalyst system, the catalyst system comprising zirconia-silica washcoat particles, a pre-sulfated zirconia binder, and a catalyst combination comprising palladium and at least one of rhodium, ruthenium, or a mixture of rhodium and ruthenium;

a hydrogen injector that mixes a diverted portion of the fuel gas into the exhaust gas between the gas turbine and the catalytic bed;

an $H_2O$ injector that mixes $H_2O$ into the exhaust gas between the gas turbine and the catalytic bed; and sensors and valves at control points in the system connected to a controller that maintains operational conditions in the exhaust gas at the catalytic bed, wherein the operational conditions comprise a temperature between 70-250° C., a molar ratio for $H_2/NO_x$ in the range of 10-100, and $H_2O$ at a concentration of about 15-23 vol. %.

15. The system according to claim 14, wherein said catalyst combination comprises palladium and rhodium, and wherein a mass ratio of palladium to rhodium in the catalyst system is between 0.5 and 20.

16. The system according to claim 15, wherein said mass ratio of palladium to rhodium in the catalyst system is between 7.5 and 15.

17. The system according to claim 14, wherein said catalyst combination comprises palladium and ruthenium, and wherein a mass ratio of palladium to ruthenium in the catalyst system is between 0.5 and 20.

18. The system according to claim 17, wherein said mass ratio of palladium to ruthenium in the catalyst system is between 7.5 and 15.

19. The system according to claim 14, wherein said catalyst combination comprises palladium and a mixture of rhodium and ruthenium, and wherein a mass ratio of palladium to the mixture of rhodium and ruthenium in said catalyst system is from 0.5:1 to 20:1.

20. The system according to claim 14, wherein a loading of the palladium is from 0.01 to 2.0% by wt. of the catalyst system, and wherein the catalyst system further comprises a promoter.

* * * * *